A. L. MOWRY & J. F. MULLANEY.
MILK STRAINER.
APPLICATION FILED NOV. 26, 1907. RENEWED APR. 9, 1910.
966,039. Patented Aug. 2, 1910.
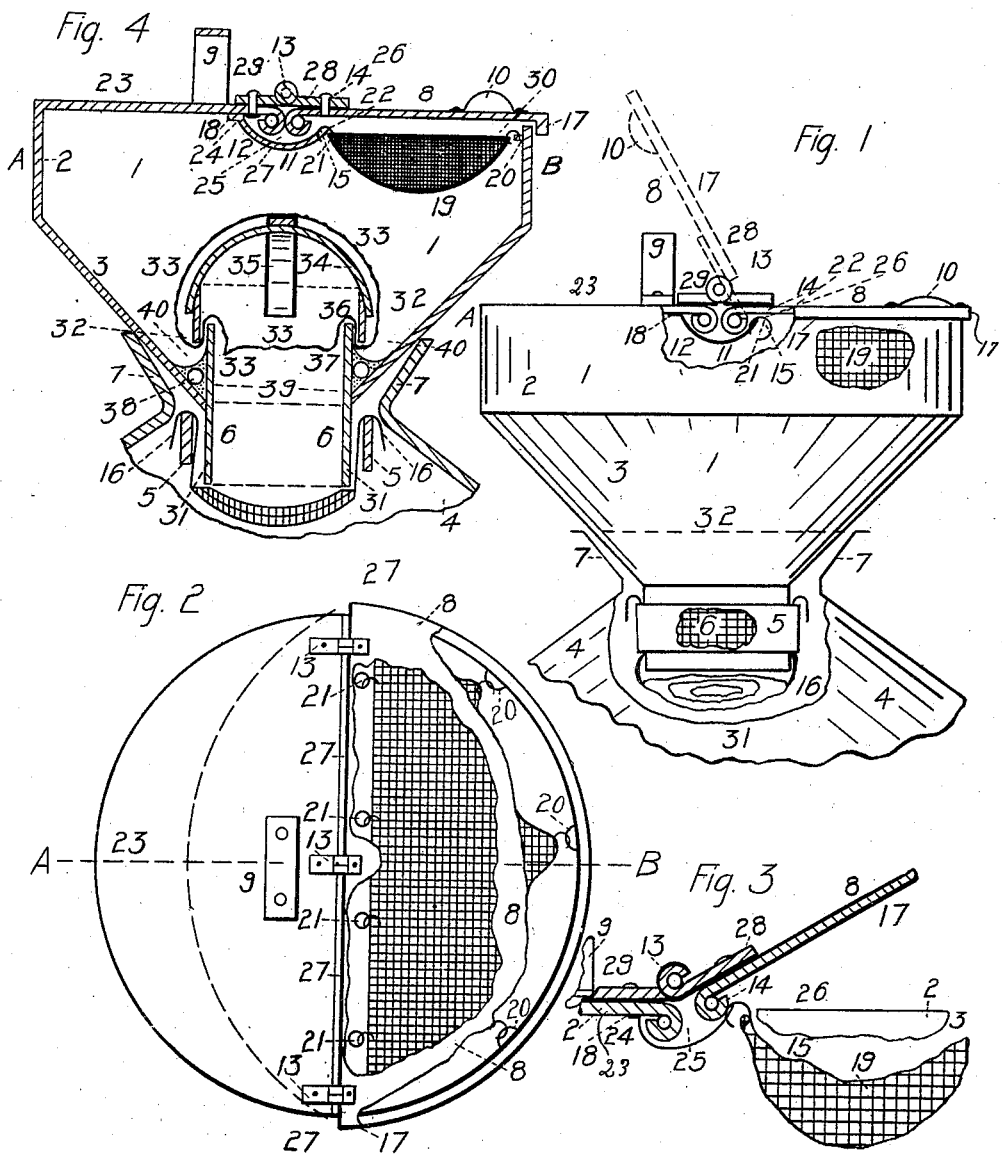
WITNESSES:
Ward Randolph
INVENTORS
Alvah L. Mowry
and By John F. Mullaney
ATTORNEY.

UNITED STATES PATENT OFFICE.

ALVAH L. MOWRY AND JOHN F. MULLANEY, OF COLORADO SPRINGS, COLORADO; SAID MOWRY ASSIGNOR TO SAID MULLANEY.

MILK-STRAINER.

966,039.  Specification of Letters Patent.  Patented Aug. 2, 1910.

Application filed November 26, 1907, Serial No. 403,953. Renewed April 9, 1910. Serial No. 554,528.

*To all whom it may concern:*

Be it known that we, ALVAH L. MOWRY and JOHN F. MULLANEY, citizens of the United States, residing in Colorado Springs, county of El Paso, State of Colorado, have invented a new and useful Milk-Strainer, of which the following is a specification.

Our invention relates to improvements in milk strainers, in which a lid, or cover, having a sanitary and dirt excluding hinge, is used in connection with a suitable receptacle to receive the unstrained milk, and having three separate fabric cloth strainers, through which the milk must pass to get out, through the bottom exit of the strainer, to the receptacle, for the strained milk: and the objects of our invention are, first, to provide a suitable strainer fabric at the intake of the receptacle that will take all large foreign particles from the milk, as it is poured in from the milk pail; second, to provide two perfect and sanitary strainers, one near the bottom of the receptacle, and one at the bottom of the exit, that will not allow any foreign particles to pass into the milk receiving can, or receptacle, below the strainer; third, to provide a strainer receptacle of such a shape that it will fit the top of a milk shipping can, in such a manner that the strainer receptacle will not tip off of the can, and will allow room for the strainer to set down into the neck of the can; fourth, to provide a closed strainer receptacle with a suitable cover and lid, to prevent flies or foreign particles of matter from getting into the strainer receptacle while it is sitting on the milk can, or other receptacle; fifth, to provide a strainer and dirt excluding safety hinge to the lid of the receptacle, so that dust or water, or foreign particles, that might alight upon the lid while it is closed, cannot pass through the hinge joint into the receptacle of the strainer below; sixth, to provide an intermediate fabric strainer at the top of the opening of the exit for the milk which will not become clogged with the debris that may be poured into the receptacle with the milk; seventh, to provide means for easily detaching the strainer fabrics and for replacing them with clean ones. We attain these objects by means of the mechanism illustrated in the accompanying drawing, in which:

Figure 1, is a side elevation of the entire machine or appliance; Fig. 2, is a top view of the appliance with a part of the lid shown removed, so as to disclose parts beneath it. Fig. 3, is a side elevation, in section, of a part of the lid and cover, showing the hinge on an enlarged scale. Fig. 4, is a side elevation, in section, on the line A B, of Fig. 2, showing the three fabric strainers, and the interior construction of our appliance.

Similar numerals refer to similar parts throughout the several views.

The upright cylindrical part 2, of the strainer receptacle, the funnel shaped part 3, of the strainer receptacle, and the cylindrical shaped nozzle 6, below the funnel shaped part, constitute the body and frame work of the appliance, to be used in combination with a milk receptacle or milk can.

The cover of the strainer consists of two parts, namely, the part 23, which is nearly half of the cover, which is rigidly attached to the top of the flange of the part 2, of the strainer receptacle by soldering or otherwise, and the lid 8, which is the movable part of the cover and which is hinged to 23, at the joint 27, by hinges 13, 13.

The funnel shaped center of tank 3, is so sloped as to fit the top edges of the milk can flange, so that the strainer body cannot careen off of the milk can or tip to the side so as to spill the contents of the strainer, and is so formed that the weight of the whole strainer rests on the inner surface of the top of the said flange 7, of the can.

It is often the practice to set the milk can in the room where the cows or other animals are being milked, and to place an open strainer on the top of the can, into which the milk is being strained as it is milked, thus exposing the milk to flies, dust, hay, chaff, and other obnoxious substances, that may get into the strainer. We obviate these difficulties by a cover composed principally of parts 23, and 8, covering the whole of the strainer receptacle.

When a milker has finished his cow or filled his pail, he goes to our strainer which rests on the top of the milk can and lifts the front of the lid 8, and tilts it back until it rests against the strainer handle 9, as shown in Fig. 1, by the dotted lines; then pours the milk into the intake of the receptacle upon the strainer fabric 19, which is usually a thin, coarse, cloth, and which catches any flies or hair, or other large and perceptible foreign substance that may have gotten into the milker's pail. The operator, or milker, then closes down the lid 8, and may go on with his milking, assured that no flies or other obnoxious matter will enter his strainer while the lid is closed.

It sometimes happens that hair, or dust, or other obnoxious stuff will get onto the top of the lid and in case of an ordinary hinged lid, the objectionable stuff would slide into the strainer through the seam 27, in the hinge, when the lid 8, is raised up to the proper position to receive the milk. To obviate this nuisance we have provided the sanitary tray 11, which extends under the hinge joint for the full length of the hinge within the strainer receptacle, and for the purpose of catching any particles that may get through the hinge joint, and keep them from getting into the milk below. This sanitary hinge tray is soldered to the under side of the stationary or integral part 23, at, or near, its free edge at 18, and 24, and then turns down below the stiffening rod 12, so as to form a depression or hollow part 25, in the sanitary tray and then turns forward and upward until it comes into contact with the underside of the hinged lid 8, when it is closed down. This is so arranged that should any dirt get through the hinge joint, it will be retained in the sanitary tray, and not get to the milk in the receptacle of the strainer.

At 20, 20, 20, are soldered small wire loops or eyes, into which may be hooked the open links or hooks 22, as shown in Fig. 3, for the purpose of sustaining the edges of the upper cloth strainer 19, and these loops or eyes are fastened to the inner surface of cylindrical part 2, of the receptacle, as shown in Fig. 2. There are small holes, 21, 21, 21, in the free edge of the sanitary hinged tray 11, into which the said open links, 22, may be hooked to support the inner edge of the upper cloth strainer 19. In a similar way is the front edge of said strainer supported from the eyes or hooks, 20. This strainer cloth 19, may be easily detached from the strainer and cleaned or a clean cloth substituted, by detaching from the said hooks.

The sanitary cloth strainer 16, with cotton fillings between two or more thicknesses of cloth fabric at the bottom end of the strainer nose 6, is intended to be used to eliminate, from the milk, bacteria or other obnoxious elements, that may pass through the intermediate strainer cloth 33. This sanitary cloth strainer 16, is held in place on the strainer nose 6, by means of the clamp ring 5, in the usual way, and can easily be removed by slipping the clamp ring 5, down, off of the strainer nose 6, when the cotton may be removed and be replaced by clean cotton, or medicated cotton, or any other cleansing filler desired.

The auxiliary cloth strainer 33, which is stretched over arches 34, and 35, and under ring 36, and then up over the top of the upward projection 37, of the top, composing the strainer nose 6, is firmly held against the convex surface of the top of projection 37, by the ring 36, which forms the base of the two edges 34, and 35. In placing this auxiliary strainer cloth in position to use, it is spread over said edges and gathered at its edges within the ring 36, then the hand of the operator is passed up through the outlet in the strainer nose, 6, until it grasps the free edges of the auxiliary strainer cloth 33. Then, while the free edges are held fast, the operator shoves down the top of the edges 34, and 35, thus placing the ring 36, down beside the convex surface of the ring 36, so that it holds the strainer cloth in position, and, as it is shoved down, it tightens the strainer cloth by stretching it across the top of the edges 34, and 35, by being held across the top of the projection 37. When the milk is poured in on top of this auxiliary strainer, the sediment of any kind that may have had a tendency to settle on the strainer cloth will be washed down to the recess 40, thus insuring that the debris or foreign substances poured into the milk strainer receptacle will not settle on the top of the strainer cloth 33, and obstruct the passage of the milk. This strainer nose 6, where it projects into the receptacle at the bottom of the funnel shaped part 3, is made rigidly integral with the funnel shaped part 3, by being soldered permanently thereto in the recess 40. There is a wire ring 38, dropped into said recess 40, and surrounding the upward projection 37, and this is covered and surrounded by the solder 39, in recess 40, as shown in Fig. 4, which makes the recess 40, sanitary, by having a tight and smooth curved bottom, easy of access for cleansing, and also makes the integuity of strainer nose 6, with funnel shaped center 3, more permanent.

To render tray 11, more sanitary and substantial, it is soldered to the part 23, of the cover at 18, and at 24, and also soldered to the underside of the rolled free edge of the part 23, of cover, under the stiffening rod 12, and also soldered at both its ends to the side of the receptacle or the inside of the cylindrical top 2, thus rendering access of milk or foreign matter to the interior of the roll around the stiffening rod 12, impossible, and also rendering it impossible for any foreign matter which may come through the hinge joint from getting into the milk receptacle below.

The strainer handle 9, is a strong, large, smooth and sanitary metal appliance, or attachment, to the top of the permanent or integral part of the cover 23, so centrally arranged as to be a support for the lid 8, when tilted back, open, and so that the operator can lift the entire strainer from the milk can or other rest upon which it is, and carry it from place to place by this handle 9, and it is attached to the part of the cover that is especially stiffened and made strong by the stiffening rod 12, and the roll of the free edge of the integral cover 23, around the stiffening rod 12, and by the integral part of the cover 23 being soldered to the top edge of the cylindrical top 2. This handle 9, is riveted and soldered to the top of the strainer cover 23, so as to be permanent, strong, and sanitary. The sanitary tray 11, also acts as a stiffening bar to the free edge of said cover 23.

The lid 8, is hinged at 27, to the integral part 23, of the cover by hinges 13, and is lifted by handle 10, or by taking hold of the outer edge of the lid 8, and is arranged so as to fold back against the rest, leaving the strainer open until the operator wishes it to be closed down, when he will force it over and down from its rest against the handle 9, as shown in Fig. 1, where it is held by its own gravitation, onto the top of the edge of cylindrical top 2, of the strainer receptacle. This lid is stiffened by means of a semi-circular stiffening flange about one-half inch broad around the outer edge of the lid 8, and extending down so as to enclasp the outside of the upper edge of the remainder of the cylindrical part 2, of the receptacle, which flange is numbered 17, and is shown in Fig. 1, and in Fig. 2, and in Fig. 4. The seam 27, of the hinge between the sanitary part 23, of cover, and lid 8, is stiffened its entire hinge length by an iron rod around which is rolled the straight edge of the lid 8.

The claims we make for the special uses, or use, of this strainer upon a milk can, or other can, we also claim as applicable and useful upon a milk tank, whether in a milk house, creamery, or wagon, or other vehicle. We also claim its utility for the straining of the saccharin and other juices and other liquids, as, for instance, the straining of the juices of the various manufactures and the saps of trees and plants and for the various liquids it may be desired to have strained and cleansed in manufactures. We also claim this form of hinge and lid as applicable for covers of receptacles other than strainers, as, for instance, pails, or cans, barrels, jars, etc., where one part of the cover may be rigidly attached to the body of the receptacle and the other part of the cover acting as a free lid hinged upon the part 23, provided with the sanitary tray, permanently attached under the hinge.

We claim:—

1. A milk strainer comprising a receptacle having a cover composed of two parts, one part being integral with said receptacle, and the other part being a lid hinged to said integral part, of a gutter shaped tray secured to the under side of the integral part of said cover under the full length of the said hinge joint to form a receptacle to arrest or convey any dirt or moisture that may settle down through the seam of said hinge, strainers located in said receptacle, one at or near the top and across the inlet, and the others at the outlet of said receptacle.

2. A strainer for milk or other liquids, comprising a central part, conically inverted in shape, a tubular bottom part projecting upwardly into the central body part, and suitable to project downwardly into the mouth of a common milk shipping can or other receptacle, a two-part cover having a hinge across near its middle part with a metal gutter extending under the seam of said hinge, all substantially as set forth.

3. A receptacle having a two-part cover, each of said parts hinged to the other near the middle and across the top of said receptacle, and having a metal gutter or tray extending across under the full length of said hinge to catch or convey any dirt or moisture that may settle down through the seam of said hinge, substantially as set forth.

4. The two part cover 23, and 8, having the gutter shaped tray 25, rigidly attached to the integral part 23, of the cover, and the hinged part 8, of cover having the annular flange 17, substantially as set forth.

5. In a strainer for milk and other liquids, the strainer nose tube 6, projecting up into the exit orifice of the receptacle of the strainer and being rigidly attached thereto by solder in the axis between it and the walls 3, 3, in combination with metal arches 34, 35, rigidly attached to the ring 36, which ring is to encompass the outside of the top end of strainer nose tube 6, and having a cloth strainer 40, passing over the top of said metal arches 34, 35, and down over the outside and under the lower edge and up on the inside of said metal ring 36, and between it and the outside of the top end of strainer nose tube 6, all substantially as set forth.

6. In a strainer for liquids a receptacle shaped substantially in the form of the frustum of an inverted cone, having a strainer at its outlet of bottom, and another strainer across its inlet at the top, and supported by means of wire hooks on wire loops fastened to the said receptacle, a two-part cover, each part covering about one half of the top of the receptacle, one part being integral with the receptacle, and the other part being hinged to the integral part, a gutter shaped tray extending the whole length of the under side of the seam of said hinge and made tight at the ends so as to hold any dirt or moisture that may settle down through the seam of said hinge and one edge of said tray being integral with the underside of the integral part of said cover and said integral part having at its top near its center, and integral therewith, an arched shaped broad handle 9, and the other part of the said cover having integral with its top side opposite to the hinge and arched handle, all substantially as set forth.

7. A receptacle having a two-part cover, one part fastened to the top of the receptacle and the other part or lid hinged to the said fastened part, said lid being provided with a flange 17, fitted near the outer edge of said lid 8, and said lid having a stiffening fold, or rod, 14, at its hinged edge, and said fastened part 23, being provided with a stiffening rod 12, and with an arched handle 9, and with a gutter shaped tray extending under the full length of said hinge, substantially as set forth.

8. In a strainer for milk or other liquids a receptacle having a cover composed of two parts, one rigidly fastened to the receptacle, and the other part, or lid, 8, being hinged to the fastened part 23, and having a gutter shaped sanitary hinge tray 11, integral with the said fastened part 23, on its under side and extending under the length of the seam of said hinge and said tray 11, having in its free edge holes, to receive the hooks to hold a cloth strainer 19, stretched across the inlet to the receptacle of said strainer, and having a cloth strainer across over the outlet of said receptacle at the bottom thereof, all in combination with a suitable tank or can into which the liquid is to be strained, substantially as set forth.

9. In a strainer for milk or other liquids, a metal ring carrying metal arches above, assuming the form of a dome, or an inverted basket, supporting a strainer cloth of one or more thicknesses, passing down over said dome or inverted basket, and upward on the inside of said ring, forming a dome shaped strainer, in combination with the upward projecting end of a metal tube at the exit of the receptacle of a strainer and made suitable to pass up on the inside of said metal ring and compress said strainer cloth between the inner surface of said metal ring and the outer surface of said metal tube, substantially as set forth.

ALVAH L. MOWRY.
JOHN F. MULLANEY.

Witnesses:
NANNIE BECK,
HERBERT K. WING.